United States Patent
McReaken et al.

(10) Patent No.: US 8,942,991 B2
(45) Date of Patent: Jan. 27, 2015

(54) AGENT-SIDE TRAVELER APPLICATION FOR MOBILE COMPUTING DEVICES

(75) Inventors: Janice McReaken, Midvale, UT (US); Nathan Grigg, Salt Lake City, UT (US); Geoffrey Paul Rayback, Salt Lake City, UT (US)

(73) Assignee: Accenture Global Services Limited, Dublin (IE)

( * ) Notice: Subject to any disclaimer, the term of this patent is extended or adjusted under 35 U.S.C. 154(b) by 68 days.

(21) Appl. No.: 13/106,508

(22) Filed: May 12, 2011

(65) Prior Publication Data

US 2012/0290201 A1    Nov. 15, 2012

(51) Int. Cl.
G06Q 10/02 (2012.01)
G06Q 50/14 (2012.01)
G07C 11/00 (2006.01)

(52) U.S. Cl.
CPC ............... *G06Q 10/02* (2013.01); *G06Q 50/14* (2013.01); *G07C 11/00* (2013.01)
USPC ............................... 705/5; 701/410; 701/439

(58) Field of Classification Search
USPC ......... 701/532, 408–410, 418, 439, 513, 517, 701/519, 527; 705/5, 6; 340/994; 235/382
See application file for complete search history.

(56) References Cited

U.S. PATENT DOCUMENTS

| | | | | |
|---|---|---|---|---|
| 5,948,040 | A  * | 9/1999 | DeLorme et al. | 701/426 |
| 6,736,317 | B1 * | 5/2004 | McDonald et al. | 235/384 |
| 7,599,847 | B2 * | 10/2009 | Block et al. | 705/5 |
| 7,761,229 | B2 * | 7/2010 | Onishi et al. | 705/5 |
| 8,215,546 | B2 * | 7/2012 | Lin et al. | 235/382 |
| 8,301,550 | B2 * | 10/2012 | Pappas et al. | 705/37 |
| 2002/0060246 | A1 * | 5/2002 | Gobburu et al. | 235/462.46 |
| 2011/0246054 | A1 * | 10/2011 | Toma | 701/200 |
| 2011/0301985 | A1 * | 12/2011 | Camp et al. | 705/5 |
| 2011/0313880 | A1 * | 12/2011 | Paul et al. | 705/26.7 |
| 2012/0023033 | A1 * | 1/2012 | Tomasz | 705/345 |
| 2012/0203586 | A1 * | 8/2012 | Blakely | 705/7.12 |
| 2012/0259669 | A1 * | 10/2012 | Stilwell et al. | 705/5 |

FOREIGN PATENT DOCUMENTS

WO    WO2010062108 A3    9/2010

OTHER PUBLICATIONS

First Patent Examination Report for Australian Application No. 2012202763 dated Apr. 8, 2013, 3 pages.
Examination Report for Canadian Application No. 2,775,532, dated Feb. 13, 2014, 4 pages.

* cited by examiner

*Primary Examiner* — Thomas Tarcza
*Assistant Examiner* — Tyler J Lee
(74) *Attorney, Agent, or Firm* — Fish & Richardson P.C.

(57) ABSTRACT

Methods, systems, and apparatus, including computer programs encoded on a computer storage medium, for generating passenger bookings along transportation routes. In some implementations, actions include generating a request at a mobile computing device, the request including route data corresponding to a route, transmitting the request to a server system, receiving route data and fare data from the server system at the mobile computing device, displaying the route data and the fare data on a display of the mobile computing device, receiving a single user input at the mobile computing device, in response to receiving the single user input, generating booking data and transmitting the booking data to the server system, receiving confirmation data from the server system at the mobile computing device, and displaying the confirmation data on the display of the mobile computing device.

18 Claims, 4 Drawing Sheets

AGENT-SIDE TRAVELER APPLICATION FOR MOBILE COMPUTING DEVICES

BACKGROUND

Computer reservations systems are used to facilitate travel-related transactions. Modern computer reservations systems allow users to book hotel rooms, rental cars, airline tickets and, to a lesser extent, railway and bus reservations.

SUMMARY

This specification describes systems, methods, and computer programs for generating passenger bookings along transportation routes. In general, a carrier agent (e.g., a train conductor, a bus driver, a water taxi captain, etc.) may employ a mobile device application to receive route and fare data from a server system. To generate a passenger booking for the route, the carrier agent may provide a single user input (e.g., by selecting a cash icon, by swiping a credit card, by scanning a voucher, etc.) to the mobile device application, which may in turn provide booking data to the server system. Upon confirmation of the booking by the server system, confirmation data may be presented to the carrier agent by the mobile device application.

One innovative aspect of the subject matter described in this specification may be embodied in methods that include the actions of generating a request at a mobile computing device, the request including route data corresponding to a route, transmitting the request to a server system, receiving route data and fare data from the server system at the mobile computing device, displaying the route data and the fare data on a display of the mobile computing device, receiving a single user input at the mobile computing device, in response to receiving the single user input, generating booking data and transmitting the booking data to the server system, receiving confirmation data from the server system at the mobile computing device, and displaying the confirmation data on the display of the mobile computing device.

Other embodiments of these aspects include corresponding systems, apparatus, and computer programs, configured to perform the actions of the methods, encoded on computer storage devices.

These and other embodiments may each optionally include one or more of the following features. For instance, the request further includes location data corresponding to a location of the mobile computing device, the location data includes global positioning system data; the route includes a plurality of stops, and the route data and fare data includes route data and fare data for each of the stops; the route data includes a number of bookings available for each of the stops; the single user input is a user interface control selection; the single user input is a voice command; the single user input is a scan performed by the mobile computing device; actions further include providing a receipt including the confirmation data, the receipt is provided by printing, the receipt is provided electronically; and the actions further include receiving route data updates from the server system and displaying the route data updates on the display of the mobile computing device, based on booking data transmitted to the server system by another mobile computing device.

Particular embodiments of the subject matter described in this specification may be implemented so as to realize one or more of the following advantages. Passenger payments can be processed efficiently while ensuring that the vehicles do not become overbooked while bringing aboard passengers. Multiple carrier agents can book passengers concurrently. Passengers may purchase tickets The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
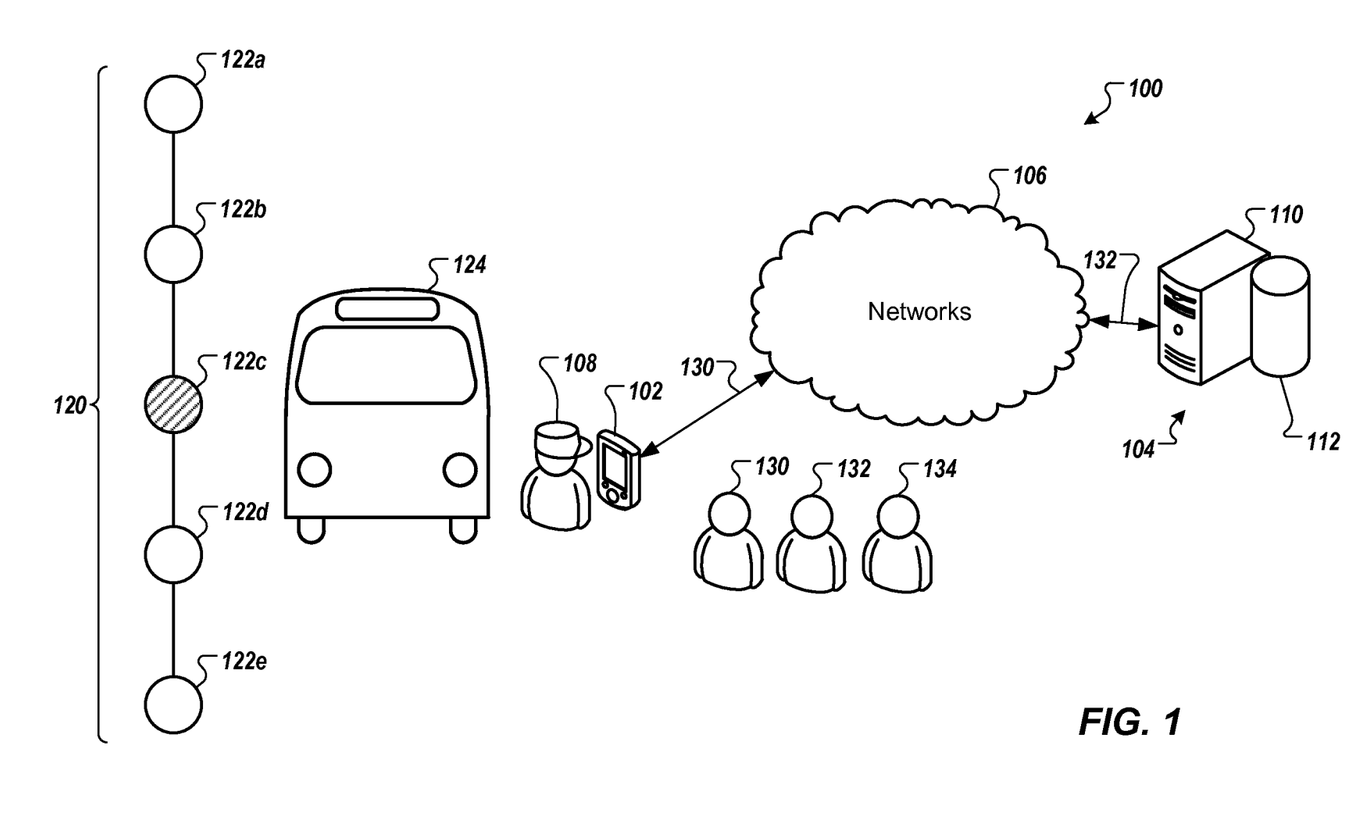
FIG. 1 depicts an example system that can implement an agent-side traveler application for mobile devices.

FIG. 1 depicts an example system 100 that can implement an agent-side traveler application for mobile devices. FIG. 1 also illustrates an example of interactions within the system 100, including interactions between a mobile computing device ("client device") 102 and a server system 104 via one or more networks 106.

The client device 102, for example, may be a smart phone, e-book reader, personal digital assistant (PDA), tablet computer, music player, notebook computer, or any other suitable computer device. The client device 102 can include one or more processors configured to execute instructions stored by a computer-readable medium for performing various device operations, such as input/output, communication, data processing, and the like. For example, the processor(s) may be used to execute a transportation application, which is described in further detail below.

The server system 104 may include one or more servers 110 (e.g., a server farm) including one or more processors configured to execute instructions stored by a computer-readable medium for performing various server operations. The server system 104 may also include one or more data stores 112 for providing route and fare data associated with transportation routes and for maintaining (e.g., adding, updating, deleting) booking data associated with route passengers.

The networks 106 connecting the client device 102 and the server system 104 may be wired or wireless, and may include a packet-based network, such as a TCP-IP network. The networks 106 may include a local area network (e.g., an intranet), a wireless local area network (WLAN) or WiFi network, a Third Generation (3G) or Fourth Generation (4G) mobile telecommunications network, a wide area network, the Internet, or any appropriate combination thereof.

In general, implementations of the present disclosure may include generating and transmitting a request for route data, receiving and displaying the route data, receiving one or more inputs, generating and transmitting booking data in response to the input, and receiving and displaying booking confirmation data.

For example, a carrier agent 108 may employ the client device 102 to access a transportation application running on the client device 102, and to use the transportation application generate a request for route data corresponding to a route 120. In the present example, the route 120 includes multiple stops 122*a*-122*e*. As the vehicle 124 (e.g., a train, bus, ferry, etc.) travels along the route 120, for example, the carrier agent 108 may assist one or more passengers (e.g., passengers 130, 132, 134) in booking passage on the vehicle 124 at any stop on the route 120.

In one example, as the vehicle 124 arrives at stop 122*c*, the carrier agent 108 may use the transportation application to request data corresponding to the route 120. The data corresponding to the route 120 may include data identifying the stop 122*c* at which the vehicle 124 has arrived, previous stops (i.e., stops 122*a* and 122*b*) that the vehicle 124 has already arrived at and departed from, upcoming stops (i.e., stops 122*d* and 122*e*) at which the vehicle 124 will be stopping, a sequence of the stops, a route between stops, or other information.

As shown by communication arrows 130, 132, the request can be transmitted to the server system 104 via the networks 106. The server system 104 can receive the request, and can retrieve route data corresponding to the route 120 and the stop 122*c* from the data store 112, for example, based on route and/or location identifiers provided by the transportation application.

As shown by communication arrows 132, 130, the transportation application executed by the device 102 can receive route data retrieved by the server system 104. For any one or more of the stops 122*a*-*e*, the route data can include stop identifiers (e.g., names, codes), arrival times, departure times, fares, current numbers of passenger bookings (e.g., tickets, seats, cabins, etc.) available or reserved, payment options, and the like.

As one or more passengers 130, 132, 134 board the vehicle 124, the carrier agent 108 may use the transportation application to generate bookings for the passengers and to process passenger fares. For example, the passenger 130 may not have a current reservation, and may board the vehicle 124 at stop 122*c*. As the passenger 130 boards, for example, the carrier agent 108 may inquire about the passenger's intended destination. In the present example, the passenger 130 expresses an intention to travel to stop 122*e*. The carrier agent 108 can use the transportation application to determine, for example, the fare between stops 122*c* and 122*e*, the number of bookings available for the route segment, and the available payment options. Upon relaying such information to the passenger 130, for example, the passenger may present payment (e.g., cash, credit, voucher, etc.) to the carrier agent 108, and the agent may use the transportation application to process the payment. With a single user input (e.g., a control selection, a voice command, a card swipe, a code scan, etc.), the carrier agent 108 can use the transportation application to generate a booking for passenger 130. The single user input can be provided by multiple users using respective client devices. For example, multiple carrier agents 108 can each use respective client devices 102, and can each provide single inputs to transportation applications executed by the devices.

In response to receiving the single user input, the transportation application can generate booking data and can transmit the data to the server system 104 via the networks 106. The booking data may include the minimum information required at the server system 104 to commit a booking, such as a name, payment information, a destination, or other information. When portions of this information are not known to the transportation application, default values or placeholder values may be sent to the server system 104, to minimize the amount of information that the carrier agent 108 must enter through the mobile device 102. Furthermore, portions of the booking data may be automatically determined, e.g., through information that is encoded on the credit card, through speech recognition, or through other approaches.

The server system 104 may process the data, for example, by updating route, vehicle, and/or passenger data maintained by the data store 112. For example, the server system 104 can decrement the number of available bookings or seats available on the vehicle 124 on the route 120 for the route segment between stops 120*c* and 122*e*. As another example, the server system 104 can process the payment of the passenger 130.

The server system 104 may confirm the booking, and may provide confirmation data to the client device 102 via the networks 106. For example, the confirmation data may include data such as confirmation codes, starting and destination point information, payment information, passenger status information, and the like. The confirmation data may be presented to the carrier agent 108 by the transportation application, for example.

By providing integration between the transportation application executed by the client device 102 and the back-end server system 104, for example, the system 100 can provide accountability for passenger bookings along the route 120. Thus, the carrier agent 108 can process passenger payments efficiently while ensuring that the vehicle 124 does not become overbooked while bringing aboard additional passengers.

Figure 2A:
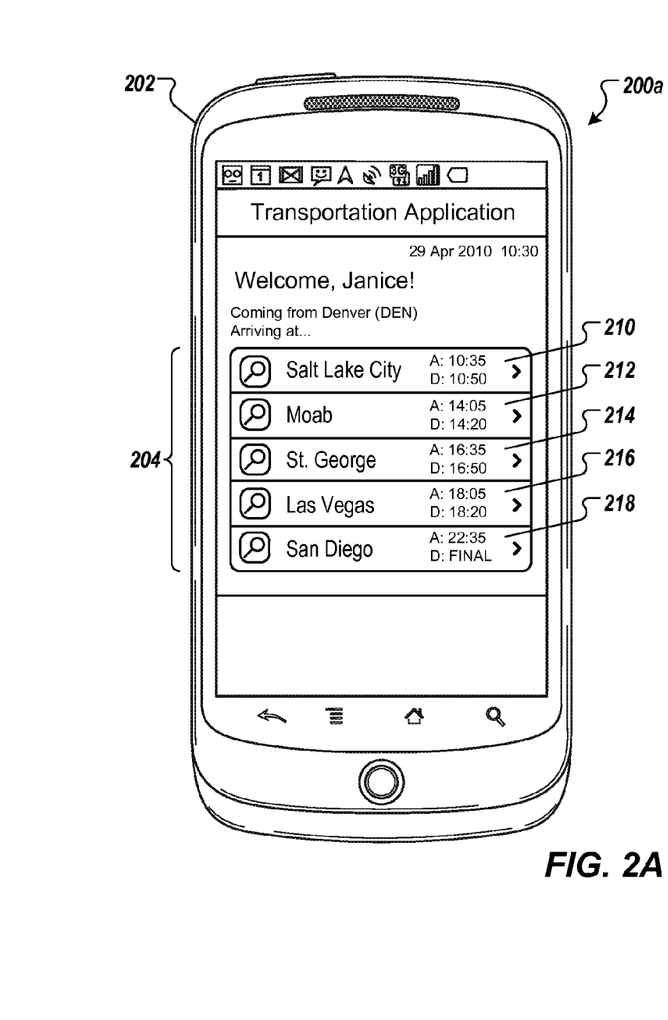
FIGS. 2A-2C depict example screenshots displayed on an example mobile computing device.
Figure 2B:
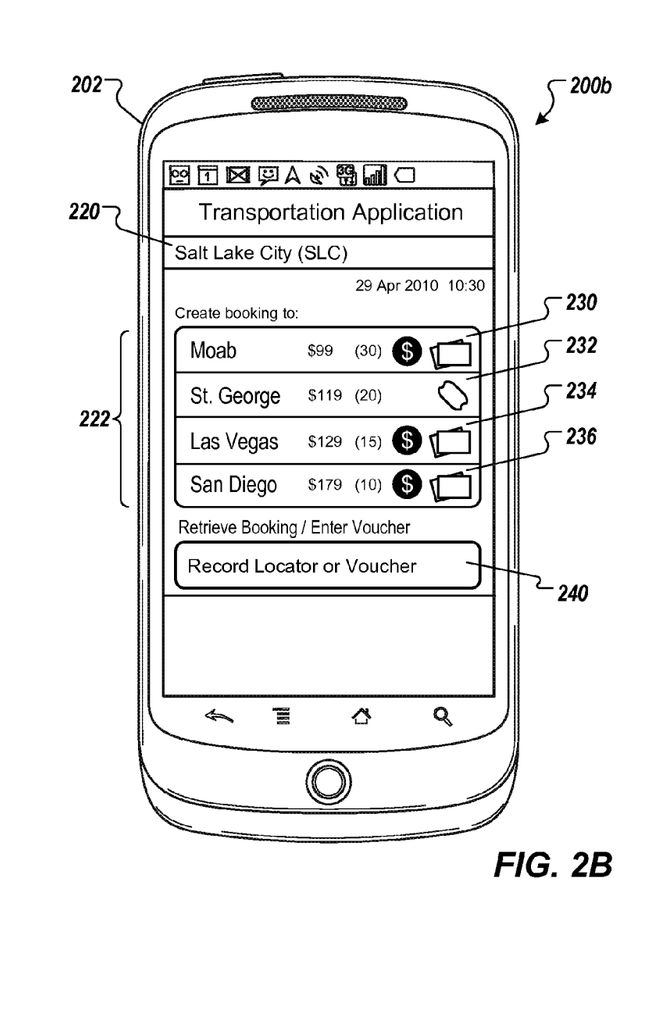
Figure 2C:
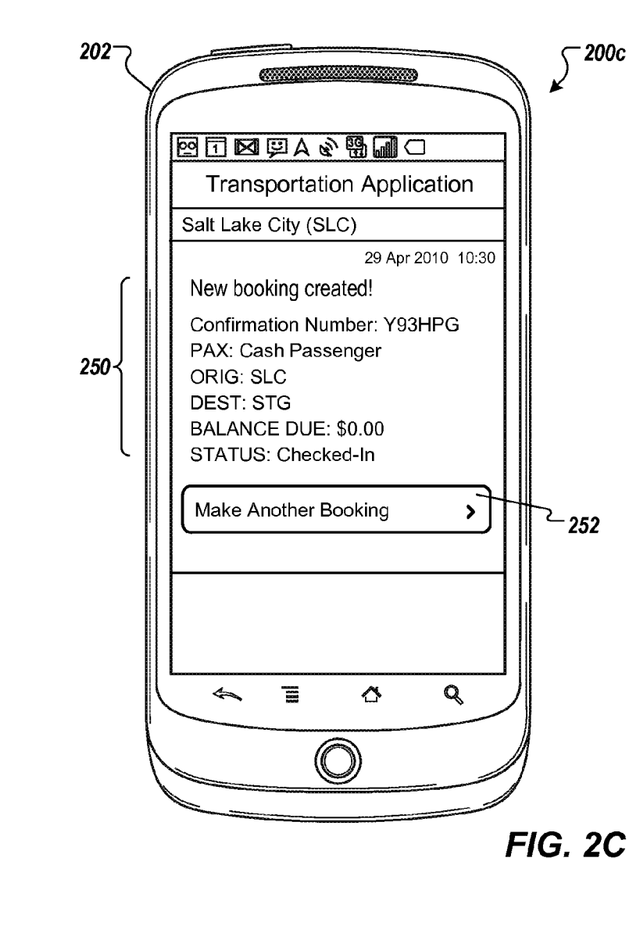

FIGS. 2A-2C depict example screenshots 200*a*, 200*b*, 200*c*, that are displayed on an example mobile computing device 202. In some implementations, the example screenshots may pertain to the transportation application executed by the client device 102 (shown in FIG. 1).

With particular reference to FIG. 2A, the example screenshot 200*a* shows the transportation application prior to arriving at a particular stop (e.g., Salt Lake City). For example, the carrier agent 108 may provide login information to the transportation application and may be presented with a relevant home screen including her user name (e.g., Janice), a description of a previous stop (e.g., Denver), and a list 204 of stops along the route.

The list 204, for example, can be based on route schedule information maintained and provided by the server system 104, and can include identifiers (e.g., names) of stops, and arrival/departure times for each stop. For example, upon logging in, the transportation application can provide a route identifier to the server system 104. Based at least in part on the route identifier, for example, the server system 104 can reference route data (e.g., stop identifiers for stops along the route, arrival and departure times for each stop, numbers of bookings available at each stop, fares for passage between stops, available payment options, etc.) corresponding to the route, and can provide such route data to the transportation application.

The list 204 of stops may include selectable controls 210, 212, 214, 216, 218, each of the stops in the list 204 associated with a different selectable control. In some implementations, the list 204 may include all stops along a route. For example, the list 204 can include selectable controls associated with previously visited stops, current stops, and stops yet to be visited. In some implementations, controls associated with previously visited stops may be differentiated from other controls. For example, after leaving the stop associated with the control 210 (e.g., Salt Lake City), the transportation application can visually alter (e.g., dim or gray out) the control 210 to indicate that the associated stop has been visited. In some implementations, the list 204 may include current stops and stops yet to be visited. For example, controls associated with previously visited stops may be removed from the list 204 of stops.

By selecting one of the controls 210, 212, 214, 216, or 218, for example, the carrier agent 108 can view route information applicable to the stop associated with the selected control, and can be presented with options to create bookings from the stop. In the present example, prior to or upon arrival at Salt Lake City, the carrier agent 108 may select the control 210 associated with the Salt Lake City stop to place the transportation application in a mode for creating passenger bookings from Salt Lake City.

Referring to FIG. 2B, the example screenshot 200b shows the transportation application in a mode for creating bookings. For example, the booking creation screen can include an identification control 220 for displaying an identifier (e.g., a name) associated with the stop (e.g., Salt Lake City) from which the carrier agent 108 intends to book passengers.

The booking creation screen can also include a list 222 of stops along the route yet to be visited (e.g., downline stops), for example, with route information relevant to each of the stops. In the present example, fares for passage between Salt Lake City and each of the downline stops (e.g., Moab, St. George, Las Vegas and San Diego) are presented with the number of bookings available. For example, between Salt Lake City and St. George, twenty bookings are available at $119 each.

The list 222 of downline stops may include selectable controls 230, 232, 234, 236, each of the stops in the list associated with a different selectable control. For example, by interacting with the selectable control 232, the carrier agent 108 may use the transportation application to create a passenger booking between Salt Lake City and St. George. As another example, ticket or voucher scanning operations may be initiated from the booking creation screen. For example, upon receiving user input associated with interaction with a selectable control 240 (e.g., a record locator or voucher input control), the transportation application can trigger a data collection mechanism (e.g., a barcode scanner, a radio frequency chip scanner, a camera, etc.) for processing a ticket or voucher presented by a passenger.

In some implementations, upon receiving a user input associated with the booking of a passenger, the transportation application may present an indication of receiving the input. For example, upon receiving a user input (e.g., selection of the control 232, selection of the control 240, swiping of a credit card, a voice command, etc.) from the carrier agent 108, one or more graphic symbols representing available payment options (e.g., cash, credit cards, vouchers, etc.) may be replaced with one or more graphic symbols (e.g., a ticket icon) representing processing of the passenger booking. In response to receiving the input, the transportation application can generate booking data, transmit the booking to the server system 104, and receive confirmation data.

Referring to FIG. 2C, the example screenshot 200c shows the transportation application in a mode for displaying confirmation data for the generated booking. For example, the booking confirmation screen can include a confirmation data presentation area 250 for displaying confirmation data such as a booking confirmation number, payment information, stop identifiers for the booking origin and destination, and passenger status.

In some implementations, upon confirmation of the booking, the transportation application may provide a receipt for the booking. For example, the transportation application may be in communication with a printing device (e.g., a wireless printing device, or a printing device coupled to the mobile computing device 202) for printing receipts for bookings. As another example, the transportation application may electronically provide receipts. For example, receipt data may be provided by the transportation application and/or the server system 104 to passengers via e-mail, messaging services, or mobile device applications.

In the present example, the carrier agent 108 may return to the booking creation screen (shown in FIG. 2B) by interacting with a control 252. In some implementations, the number of bookings available for a particular route segment may be maintained in real-time, and updates may be determined and presented as they occur. For example, upon returning to the booking creation screen, the number of bookings available between Salt Lake City and St. George may be decremented from twenty to nineteen, and the number of bookings available between Salt Lake City and Moab may be decremented from thirty to twenty-nine.

In some implementations, some transportation vehicles may employ multiple carrier agents, each using an instance of the transportation application. As a carrier agent uses the transportation application to create bookings for passengers, for example, the server system 104 may provide route data updates (e.g., number of available bookings for a segment) to instances of the transportation application used by other carrier agents. Thus, multiple carrier agents may concurrently interact with route data provided by the server system 104.

Figure 3:
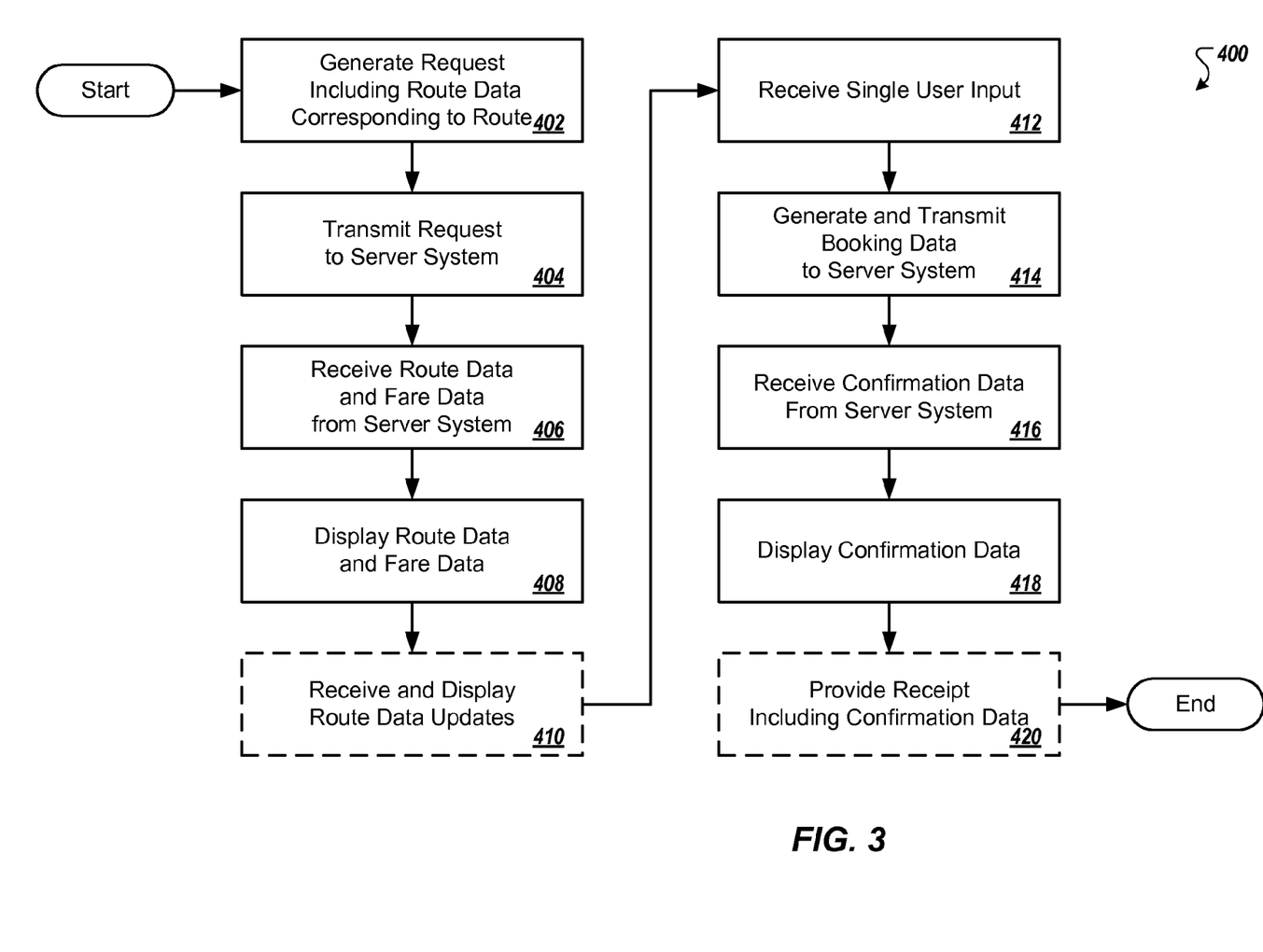
FIG. 3 is a flowchart of an example process that can be executed in accordance with implementations of the present disclosure.

FIG. 3 is a flowchart of an example process 300 that can be executed in accordance with implementations of the present disclosure. In some implementations, the process 300 may be performed by the system 100, and will be described as such for the purpose of clarity. Briefly, the process 300 includes generating a route request at a mobile computing device, transmitting the request to a server system, receiving route data and fare data from the server system, displaying the route data and the fare data on a mobile computing device display, receiving a single user input at the mobile computing device, generating booking data and transmitting the booking data to the server system, receiving confirmation data from the server system at the mobile computing device, and displaying the confirmation data.

In more detail, a request can be generated (402) at a mobile computing device. For example, the client device 102 can generate a request including route data corresponding to the route 120. The route data, for example, may include a route identifier associated with the route 120, the vehicle 124, and/or the carrier agent 108. Such data may be provided during a login operation performed by the carrier agent 108, for example, or may be otherwise provided by the client device 102 (e.g., by retrieving data stored in a configuration file).

In some implementations, the request may also include location data corresponding to a mobile device location. For example, the client device 102 may provide global positioning system (GPS) data to the transportation application, and the transportation application may use such data when generating the request. As another example, the carrier agent 108 may use the transportation application to enter location data. As another example, location of the client device 102 may be inferred based on route schedules and current times.

The request can be transmitted (404) to a server system. For example, the client device 102 can transmit the request to the server system 104 via the networks 106. The server system 104 can receive the request, for example, and can retrieve route data and fare data corresponding to the request from the data store 112. For example, based at least in part on the route identifier associated with the route 120, the server system 104 can retrieve corresponding route data and fare data. As another example, based at least in part on the identifier associated with the carrier agent 108 and/or vehicle 124, the server system 104 can retrieve route data and fare data associated with a route currently assigned to the agent and/or vehicle. As another example, based at least in part on location data associated with the client device 102, the server system 104 can retrieve route data and fare data relevant to the device location.

In some implementations, a route may include multiple stops, and the route data and fare data may be retrieved for each of the stops. For example, route and fare data for each of the stops 122a-122e along the route 120 may be retrieved. In the present example, considering stop 122c, route and fare data relevant to each downline segment of the route 120 relative to the stop 122c (e.g., the segment between stops 122c and 122d, the segment between stops 122c and 122e, etc.) may be retrieved. For example, the segment between stops 122c and 122d may be associated with a fare, and the segment between stops 122c and 122e may be associated with another fare, etc.

In some implementations, the route data may include a number of bookings available for each of the stops. In the present example, considering stop 122c, a number of bookings may be available between stops 122c and 122d, another number of bookings may be available between stops 122c and 122e, etc. The number of bookings available for a segment of the route 120 can be determined by the servers 110, for example, and may be based on passenger booking data (e.g., recorded and scheduled passenger embarkments and disembarkments) maintained by the data store 112.

Route data and fare data can be received (406) from the server system at the mobile computing device. For example, route and fare data can be provided by the server system 104 to the client device 102 via the networks 106. The route data and the fare data can be displayed (408) on a display of the mobile computing device. For example, route and fare data displayed by the client device 102 may include stop identifiers, arrival and departure times for stops along the route, fares for passage along the route, payment options, numbers of passenger bookings available, and the like.

Optionally, route data updates can be received (410) from the server system and displayed on the display of the mobile computing device. For example, based on booking data transmitted to the server system 104 by another mobile computing device (e.g., a client device similar to the client device 102), the server system 104 can update booking data maintained by the data store 112 and can provide data related to the update to the client device 102. As multiple carrier agents (e.g., the carrier agent 108 and one or more similar agents) book passengers 130, 132, 134 for the route 120, for example, updated route booking information (e.g., the number of available bookings for various segments along the route 120) can be received by multiple instances of the transportation application and can be presented to the carrier agents in real-time.

In some implementations, as location data corresponding to the location of the mobile device changes, the display of route data on the mobile computing device may change. For example, upon arriving at the stop 122c, location data corresponding to the location of the client device 102 may change, and the display of route data may be altered by the transportation application to reflect the change in location. Graphics or controls associated with previously visited stops (e.g., the stops 122a, 122b) may be visually altered (e.g., grayed out), hidden, or removed, for example.

A single user input can be received (412) at the mobile computing device. In some implementations, the single user input may be a user interface control selection. Referring to FIG. 2B, for example, a carrier agent (e.g., carrier agent 108) can interact with one of the selectable controls 230, 232, 234, 236 to initiate a booking for a stop associated with the selected control. If a passenger elects to purchase a fare using cash, for example, the carrier agent may select one of the controls 230, 232, 234, 236 upon conducting a cash transaction.

In some implementations, the single user input may be a voice command. For example, the carrier agent can use a microphone input of the client device 102 to speak the name of the passenger's intended destination stop. Voice commands may provide an alternate form of user input from interacting with selectable controls, for example.

In some implementations, the single user input may be a scan performed by the mobile computing device. For example, the client device 102 can be coupled to or in communication with a magnetic stripe reader, a radio frequency chip reader, a barcode scanner, an imaging device (e.g., a camera) or another suitable type of hardware for scanning cards (e.g., credit cards, debit cards, transit cards, etc.), tickets, or vouchers. If a hardware scanning device in communication with the client device 102 happens to malfunction, for example, alternate forms of input (e.g., keyboard, voice, etc.) may be employed by the carrier agent to book passengers or to accept passenger payment.

In other implementations, more than one user input is entered. In general, booking data may include the minimum information required at the server system 104 to commit a booking, such as name, payment information, destination, or other information. If one or more portions of the minimum information are known (e.g., from data included in a scanned card, ticket, or voucher), for example, the transportation application can enter such information automatically. If one or more portions of the minimum information are unknown, for example, an interface (e.g., keyboard, voice, etc.) for entering such information may be presented by the client device 102.

In some implementations, placeholder values may be provided in place of unknown passenger information that is unrequired, and a prompt may be provided for unknown passenger information that is required. For example, if certain pieces of information (e.g., name, date of birth) are generally provided to the server system 104 for booking passengers, but are not required under certain circumstances (e.g., cash customers booking passage between route stops within a particular state), the transportation application and/or the server system 104 can use placeholders (e.g., "John Doe") or blanks for such information. If certain pieces of information are required under certain circumstances (e.g., for compliance or security reasons), for example, the transportation application can provide a prompt (e.g., an interface) for entering such information. Thus, in the present example, passengers can be efficiently booked with minimal input, and additional input can be prompted when necessary.

If a passenger had purchased passage along a segment of the route 120 using a card, ticket, or voucher, for example, data associated with the transaction and/or the passenger may be provided by the server system 104 to the transportation application. In the present example, upon receiving such information, the carrier may confirm the identity of the passenger and/or the validity of the purchase. As another example, such cards, tickets, or vouchers may be associated with monetary values and/or route segments, but not necessarily with particular passengers.

In response to receiving the single user input, booking data can be generated (414) and transmitted to the server system. For example, in response to receiving the single user input from the carrier agent 108, the client device 102 can generate booking data and can transmit the data to the server system 104. The server system 104, for example, can update route, vehicle, and/or passenger data maintained by the data store 112. For example, the server system 104 can update the number of bookings available at various route stops, and can process passenger payments. The server system 104 can confirm the booking, for example, and can provide confirmation data. In some implementations, booking availability information may be included in the confirmation data. For example, in an environment including multiple carrier agents and/or multiple booking agents, a seat that appears to be open prior to submitting a booking request may become unavailable during transmission of the request. In the present example, the confirmation data may include a message that the seat is unavailable. As another example, information associated with one or more alternatives (e.g., alternative seats) may be presented by the transportation application.

In some implementations, booking data can be cached during periods of limited network or server availability. For example, if the network 106 or server system 104 becomes unavailable, the client device 102 can cache booking data until such resources become available. In the present example, the client device 102 can maintain a copy of the booking data associated with a current route, and the data can be synchronized with server data during periods of availability.

Confirmation data can be received (416) from the server system at the mobile computing device. For example, the client device 102 can receive the confirmation data from the server system 104. The confirmation data can be displayed (418) on the display of the mobile computing device. Referring to FIG. 2C, for example, the confirmation data may include data such as confirmation codes, information associated with the starting point and destination point for the booked passage, payment information, and passenger status information.

Optionally, a receipt including the confirmation data may be provided (420). In some implementations, the receipt may be provided by printing. For example, the client computing device 102 may be coupled to or in communication with a device for printing paper-based receipts. In some implementations, the receipt may be provided electronically. For example, if a passenger provides a form of payment (e.g., a ticket, or voucher, or card) for booking passage including passenger information, or including an identifier that can be associated with previously provided passenger information maintained by the server system 104, receipt data may be provided to the passenger electronically (e.g., via e-mail, messaging, a mobile device application, or the like).

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method, comprising:
    generating a request for route data and fare data at a mobile computing device, the request comprising route and location identification data corresponding to a route being travelled by an agent employing the mobile computing device, the route comprising a plurality of stops;
    transmitting the request to a server system;
    receiving, by the mobile computing device and from the server system, route data and fare data relevant to each segment of the route between a stop from which the agent intends to book passengers and each stop along the route that is yet to be visited;
    displaying the route data and the fare data relevant to each segment of the route on a display of the mobile computing device, wherein each segment of the route is associated with a respective selectable user interface control, and wherein each user interface control is configured to initiate passenger booking upon selection;
    while displaying the route data and the fare data relevant to each segment of the route on the display of the mobile computing device, receiving a single user input at the mobile computing device, the single user input indicating an intent of the agent to initiate a booking of a passenger for a segment of the route and to process a passenger fare at the stop;
    in response to receiving the single user input, generating booking initiation data and transmitting the booking initiation data to the server system;
    receiving booking confirmation data from the server system at the mobile computing device; and
    displaying the booking confirmation data on the display of the mobile computing device.

2. The computer-implemented method of claim 1, wherein the location identification data corresponds to a current location of the mobile computing device.

3. The computer-implemented method of claim 2, wherein the location identification data includes global positioning system data.

4. The computer-implemented method of claim 1, wherein the route data and fare data includes route data and fare data for each of the stops.

5. The computer-implemented method of claim 4, wherein the route data includes a number of bookings available for each of the stops.

6. The computer-implemented method of claim 1, wherein the single user input is a voice command.

7. The computer-implemented method of claim 1, wherein the single user input is a scan performed by the mobile computing device.

8. The computer-implemented method of claim 1, further comprising providing a receipt including the booking confirmation data.

9. The computer-implemented method of claim 8, wherein the receipt is provided by printing.

10. The computer-implemented method of claim 8, wherein the receipt is provided electronically.

11. The computer-implemented method of claim 1, further comprising receiving route data updates from the server system and displaying the route data updates on the display of the mobile computing device, based on booking initiation data transmitted to the server system by another mobile computing device.

12. A system comprising:
    one or more computers; and
    a computer-readable medium coupled to the one or more computers having instructions stored thereon which, when executed by the one or more computers, cause the one or more computers to perform operations comprising:
    displaying, at a mobile computing device transported by a travel conveyance along a route comprising a plurality of stops, a booking interface comprising real-time information regarding an availability of seats on the travel conveyance for each segment of the route between a stop from which an agent intends to book passengers and each stop along the route that is yet to be visited, wherein each segment of the route is associated with a respective selectable user interface control for reserving a seat on the travel conveyance, and user selection of the user interface control initiates seat reservation for a corresponding segment of the route;
    while displaying the real-time information relevant to each segment of the route on the booking interface, receiving a single user selection of the control on the booking interface, the single user selection indicating an intent of the agent to initiate a booking of a passenger for the segment of the route and to process a passenger fare at the stop;
    in response to receiving the single user selection of the control, generating and transmitting a request to reserve the seat on the travel conveyance;
    receiving confirmation data regarding the request to reserve the seat on the travel conveyance; and
    displaying on the booking interface information comprising a representation of the confirmation data.

13. A computer readable non-transitory storage medium encoded with a computer program, the program comprising instructions that when executed by one or more computers cause the one or more computers to perform operations comprising:
receiving, by a mobile device transported by a travel conveyance along a route comprising a plurality of stops, a one-click selection of a button on a user interface of a travel application, wherein the user interface displays real-time information relevant to each segment of the route between a stop from which passengers are to be booked and each stop along the route that is yet to be visited, wherein each segment of the route is associated with a respective selectable button on the user interface of the travel application, wherein the one-click selection is input by an agent of a travel provider, wherein the one-click selection of the button indicates an intent of the agent to initiate a booking of a passenger for a corresponding segment of the route and to process a passenger fare at the stop, and wherein the one-click selection is received while the real-time information relevant to each segment of the route is displayed by the mobile device; and
in response to receiving the one-click selection, checking a current availability of a seat on the travel conveyance and, if the seat is currently available, committing the seat on the travel conveyance, through electronic communication between the travel application and a server system operated by the travel provider.

14. The computer-implemented method of claim 1, wherein the single user input comprises a selection of one of the respective selectable user interface controls.

15. The system of claim 12, wherein the operations further comprise:
generating and transmitting a request for route data at the mobile computing device, the request comprising route and location identification data corresponding to a current location of the mobile computing device on the route; and
receiving, by the mobile computing device, route data relevant to each segment of the route that is currently being travelled.

16. The system of claim 12, wherein the operations further comprise providing an electronic receipt including the confirmation data.

17. The computer readable non-transitory storage medium of claim 13, wherein the operations further comprise:
generating and transmitting a request for route data at the mobile device, the request comprising route and location identification data corresponding to a current location of the mobile device on the route; and
receiving, by the mobile device, route data relevant to each segment of the route that is currently being travelled.

18. The computer readable non-transitory storage medium of claim 13, wherein the operations further comprise, in response to receiving the one-click selection, providing an electronic receipt including confirmation data related to committing the seat on the travel conveyance.

* * * * *

UNITED STATES PATENT AND TRADEMARK OFFICE
CERTIFICATE OF CORRECTION

PATENT NO. : 8,942,991 B2
APPLICATION NO. : 13/106508
DATED : January 27, 2015
INVENTOR(S) : Janice McReaken, Nathan Grigg and Geoffrey Paul Rayback It is certified that error appears in the above-identified patent and that said Letters Patent is hereby corrected as shown below:

Title Page, item [73] (Assignee), line 2, delete "Dublin" and insert -- Dublin 4 --, therefore.

Signed and Sealed this
Nineteenth Day of May, 2015

Michelle K. Lee
*Director of the United States Patent and Trademark Office*